United States Patent
Lee et al.

(10) Patent No.: US 8,081,416 B2
(45) Date of Patent: Dec. 20, 2011

(54) MULTILAYER CHIP CAPACITOR

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 321 days.

(21) Appl. No.: 12/267,112

(22) Filed: Nov. 7, 2008

(65) Prior Publication Data
US 2009/0279228 A1    Nov. 12, 2009

(30) Foreign Application Priority Data
May 8, 2008    (KR) .................. 10-2008-0042819

(51) Int. Cl.
*H01G 4/005*    (2006.01)
*H01G 4/228*    (2006.01)
(52) U.S. Cl. ............... 361/303; 361/306.3; 361/311
(58) Field of Classification Search .......... 361/303–305, 361/311, 306.1, 306.3, 309
See application file for complete search history.

(56) References Cited

U.S. PATENT DOCUMENTS

| | | | |
|---|---|---|---|
| 5,880,925 A | 3/1999 | Dupre et al. | |
| 6,441,459 B1 | 8/2002 | Togashi et al. | |
| 7,262,952 B2 * | 8/2007 | Lee et al. .................. | 361/306.3 |
| 7,551,422 B2 * | 6/2009 | Togashi ........................ | 361/309 |
| 2004/0027787 A1 * | 2/2004 | Yamauchi et al. .......... | 361/321.2 |
| 2006/0176644 A1 | 8/2006 | Togashi et al. | |

FOREIGN PATENT DOCUMENTS

| | | |
|---|---|---|
| JP | 2000-208361 | 7/2000 |
| JP | 2006-210719 | 8/2006 |
| KR | 10-2007-0052656 A | 5/2007 |

OTHER PUBLICATIONS

Korean Office Action issued in Korean Patent Application No. KR 10-2008-0042819 dated Nov. 23, 2009.

* cited by examiner

*Primary Examiner* — Eric Thomas
(74) *Attorney, Agent, or Firm* — McDermott Will & Emery LLP

(57) ABSTRACT

A multilayer chip capacitor includes a capacitor body provided by a stack of a plurality of dielectric layers, a plurality of internal electrodes disposed in the capacitor body such that the internal electrodes of opposite polarities are alternately disposed to face each other with the dielectric layer interposed between each facing set of the internal electrodes, and a plurality of external electrodes disposed on an outer face of the capacitor body and electrically connected with the internal electrode. Each of the plurality of internal electrodes includes a main electrode part, and at least one lead extending from the main electrode part to a side face of the capacitor body and connected to a corresponding one of the external electrodes. The lead extends to the corresponding external electrode to be inclined with respect to the main electrode part thereof.

10 Claims, 7 Drawing Sheets

MULTILAYER CHIP CAPACITOR

CROSS-REFERENCE TO RELATED APPLICATIONS

This application claims the priority of Korean Patent Application No. 2008-0042819 filed on May 8, 2008, in the Korean Intellectual Property Office, the disclosure of which is incorporated herein by reference.

BACKGROUND OF THE INVENTION

1. Field of the Invention

The present invention relates to a multilayer chip capacitor suitable as a decoupling capacitor of a power distribution network of a micro processor unit (MPU), and more particularly, to a multilayer chip capacitor capable of increasing equivalent series resistance (ESR) while suppressing an increase of equivalent series inductance (ESL).

2. Description of the Related Art

A continuous increase of an operating frequency for a high-speed micro processor unit (MPU) is increasing current consumption, and an operating voltage for an MPU chip is being lowered. This makes it more difficult to suppress noise of a DC supply voltage below a certain level, which is generally 5~10%. Here, the noise of a DC supply voltage occurs due to a sudden fluctuation of a load current of the MPU. As a decoupling capacitor removing the voltage noise, a multilayer chip capacitor is being widely used in a power distribution network. When the load current fluctuates rapidly in the power distribution network of the MPU, the multilayer chip capacitor serves to suppress the voltage noise by supplying a current to a central processing unit (CPU).

The load current fluctuates even more rapidly as the operating frequency of the MPU further increases. Therefore, the decoupling capacitor is required to have higher capacitance, higher equivalent series resistance (ESR) and lower equivalent series inductance (ESL), so that the magnitude of an impedance of the power distribution network can be maintained at a low and constant level within a broad frequency band. This can ultimately contribute to suppressing the voltage noise caused by the sudden fluctuation of the load current.

To reduce the ESL, a multi-terminal, multilayer chip capacitor has been proposed, in which external electrodes of a positive (+) polarity alternate with external electrodes of a negative (−) polarity on both side faces of a capacitor body, leads of a first internal electrode of one polarity are interdigitated with leads of a second internal electrode of the other polarity to be adjacent to each other. However, the internal electrodes each having four or more leads result in excessively low ESR, making a power circuit unstable.

In order to prevent the excessively low ESR of the multi-terminal multilayer chip capacitor, a method of using only one lead for each internal electrode of the multi-terminal multilayer chip capacitor has been proposed. However, there is a limitation in increasing the ESR by simply reducing the number of leads. For example, the ESR is about 7.7 mΩ in the case of a related art 8-terminal multilayer chip capacitor (1.0 μF) with a size of 1608 (1.6 mm×0.8 mm), which includes leads in an interdigitated arrangement. However, in the case of a related art multilayer chip capacitor having an internal electrode with a single lead, the ESR thereof is about 11.8 mΩ.

SUMMARY OF THE INVENTION

An aspect of the present invention provides a multilayer chip capacitor capable of easily increasing equivalent series resistance (ESR) while suppressing an increase of equivalent series inductance (ESL).

According to an aspect of the present invention, there is provided a multilayer chip capacitor including: a capacitor body provided by a stack of a plurality of dielectric layers; a plurality of internal electrodes disposed in the capacitor body such that the internal electrodes of opposite polarities are alternately disposed to face each other with the dielectric layer interposed between each facing set of the internal electrodes; and a plurality of external electrodes disposed on an outer face of the capacitor body and electrically connected with the internal electrode. Each of the plurality of internal electrodes includes: a main electrode part; and at least one lead extending from the main electrode part to a side face of the capacitor body and connected to a corresponding one of the external electrodes, the lead extending to the corresponding external electrode to be inclined with respect to the main electrode part thereof.

The lead may have a smaller width at a connection portion with the main electrode part than at a connection portion with the corresponding external electrode. The lead may be gradually tapered from the connection portion with the corresponding external electrode to the connection portion with the main electrode part thereof.

The lead connected to the external electrode disposed at an end portion of the side face of the capacitor body may extend toward a central portion of the main electrode part from the external electrode disposed at the end portion of the side face of the capacitor body.

The capacitor may have first and second side faces facing each other. The plurality of external electrodes may be disposed on the first and second side faces such that the external electrodes of opposite polarities are alternately disposed on each of the first and second side faces. Each of the internal electrodes may have two leads extending to the first and second side faces to be connected to the external electrodes, respectively. The lead extending to the first side face and the lead extending to the second side face in each of the internal electrodes may be offset by one adjacent external electrode position, and the leads of the plurality of internal electrodes may be disposed in zigzags along a stack direction when viewed from each of the first and second side faces.

Four external electrodes may be disposed on each of the first and second side faces. First to fourth external electrodes may be disposed on the first side face, fifth and eighth external electrodes may be disposed on the second side face, and the first to eighth external electrodes may be sequentially disposed along a circumference of the capacitor body.

The plurality of internal electrodes may include first to sixth internal electrodes sequentially consecutively stacked on top of each other. Each of the first to sixth internal electrodes may have two leads respectively extending to the first and second side faces, the two leads each being connected to a corresponding one of the external electrodes. The leads of the first to fourth internal electrodes extending to the first side face may be respectively connected to the first to fourth external electrodes, the lead of the fifth internal electrode extending to the first side face may be connected to the third external electrode, and the lead of the sixth internal electrode extending to the first side face may be connected to the second external electrode. The leads extending to the second side face may be arranged in zigzags between the fifth external electrode and the eighth external electrode when viewed from the second side face. The lead extending to the first side face and the lead extending to the second side face in each of the internal electrodes may be offset by one adjacent external electrode position.

The plurality of internal electrodes may include first to second internal electrodes of opposite polarities alternately disposed along a stack direction, the first and second internal electrodes each having at least two leads. The leads of the first internal electrodes may be interdigitated with the leads of the second internal electrodes to be adjacent to one another, and be connected with the external electrodes of a corresponding polarity.

Each of the plurality of internal electrodes may have one lead connected to a corresponding one of the external electrodes. In the internal electrodes of opposite polarities having leads extending to the same side face of the capacitor body and disposed adjacent to each other in a stack direction, the leads may be respectively connected to adjacent external electrodes on the same side face.

The capacitor body may have first and second longer side faces facing each other, and first and second shorter side faces facing each other. The plurality of external electrodes may include first and second external electrodes having opposite polarities and disposed on the first and second longer side faces, respectively. The plurality of internal electrodes may include a first internal electrode and a second internal electrode facing each other with the dielectric layer interposed between each facing set of the first and second internal electrodes.

The first and second internal electrodes may include main electrode parts and leads respectively extending from the main electrode parts to be connected to the first and second external electrodes. The leads of the first and second external electrodes may extend to the first and second external electrodes to be inclined with respect to the main electrode parts, respectively.

The plurality of internal electrodes may further include third and fourth internal electrodes facing each other with the dielectric layer interposed between each facing set of the third and fourth internal electrodes, and the first to fourth internal electrodes each may have one lead and are sequentially disposed along a stack direction.

The first internal electrode may have a first lead extending to a portion of the first longer side face adjacent to a first corner at which the first longer side face meets the first shorter side face, the first lead being connected to the first external electrode. The second internal electrode may have a second lead extending to a portion of the second longer side face adjacent to a second corner diagonally facing the first corner, the second lead being connected to the second external electrode.

The third internal electrode may have a third lead extending to a portion of the first longer side face adjacent to a third corner at which the first longer side face meets the second shorter side face, the third lead being connected to the first external electrode. The fourth internal electrode may have a fourth lead extending to a portion of the second longer side face adjacent to a fourth corner diagonally facing the third corner, the fourth lead being connected to the second external electrode.

The facing set of the first and second internal electrodes may form a current flow from the first corner toward the second corner, and the facing set of the third and fourth internal electrodes may form a current flow from the third corner toward the fourth corner.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
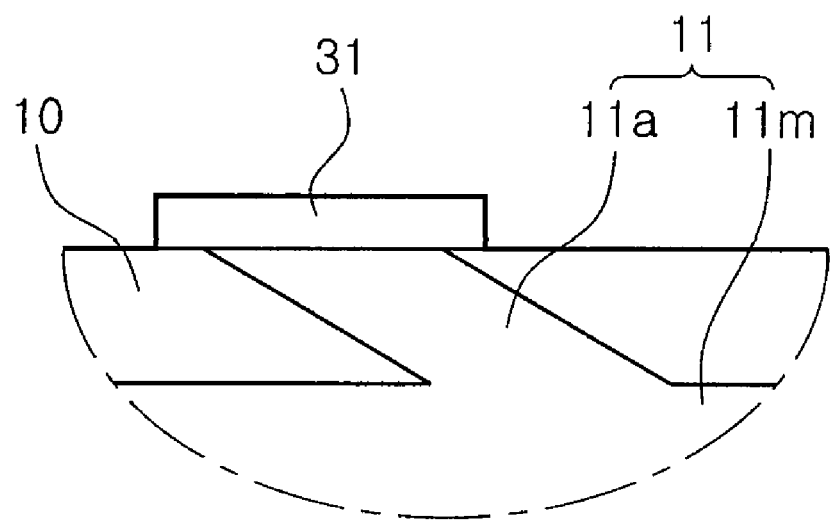
FIG. 1 is an enlarged plan view of a portion of an internal electrode of a multilayer chip capacitor, according to an exemplary embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

FIG. 1 is an enlarged plan view of a portion of an internal electrode of a multilayer chip capacitor, according to an exemplary embodiment of the present invention. Referring to FIG. 1, an internal electrode 11 formed on a dielectric layer 10 within a capacitor includes a main electrode part 11m and a lead 11a. The main electrode part 11m generally has a rectangular electrode pattern, and the lead 11a serves to connect the main electrode part 11m to an external electrode 31.

As shown in FIG. 1, the lead 11a extends to the external electrode 31 to be inclined at a predetermined angle with respect to the main electrode part 11m, thereby increasing a current path in the lead 11a. This increases equivalent series resistance (ESR) of the capacitor, and thus excessively low ESR is prevented from causing instability of a power circuit. Although the current path is increased because of the inclined lead 11a, equivalent series inductance (ESL) does not change at all or slightly increases. For example, just by inclining leads, the ESR of the multilayer chip capacitor is doubled, but an increase rate of the ESL is suppressed below 15%.

Figure 2:
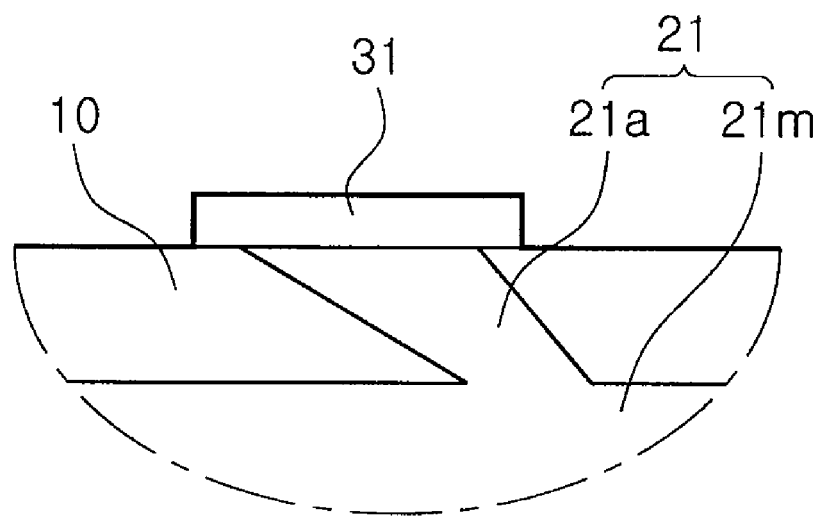
FIG. 2 is an enlarged plan view of a portion of an internal electrode of a multilayer chip capacitor, according to another exemplary embodiment of the present invention.

FIG. 2 is an enlarged plan view of an internal electrode of a multilayer chip capacitor, according to another exemplary embodiment of the present invention. Referring to FIG. 2, as in the previous embodiment (see FIG. 1), an internal electrode 21 on a dielectric layer 10 includes a main electrode part 21m and a lead 21a. The lead 21a extends to an external electrode 31 to be inclined at a predetermined angle with respect to the main electrode part 21m.

According to this embodiment, the lead 21a has a smaller width at its connection portion with the main electrode part 21m than at its connection portion with the external electrode 31. Accordingly, a current incoming from the external electrode 31 (or a current outgoing to the external electrode 31) undergoes higher electrical resistance because of the smaller width at the connection portion of the lead 21a with the main electrode part 21m, thereby further increasing the ESR of the multilayer chip capacitor. Since the width of the connection portion of the lead 21a with the external electrode 31 is greater than that between the main electrode part 21m and the lead 21a, the ESR can be further increased. Stable electrical connectivity can also be ensured between the lead 21a and the external electrode 31.

Figure 3:
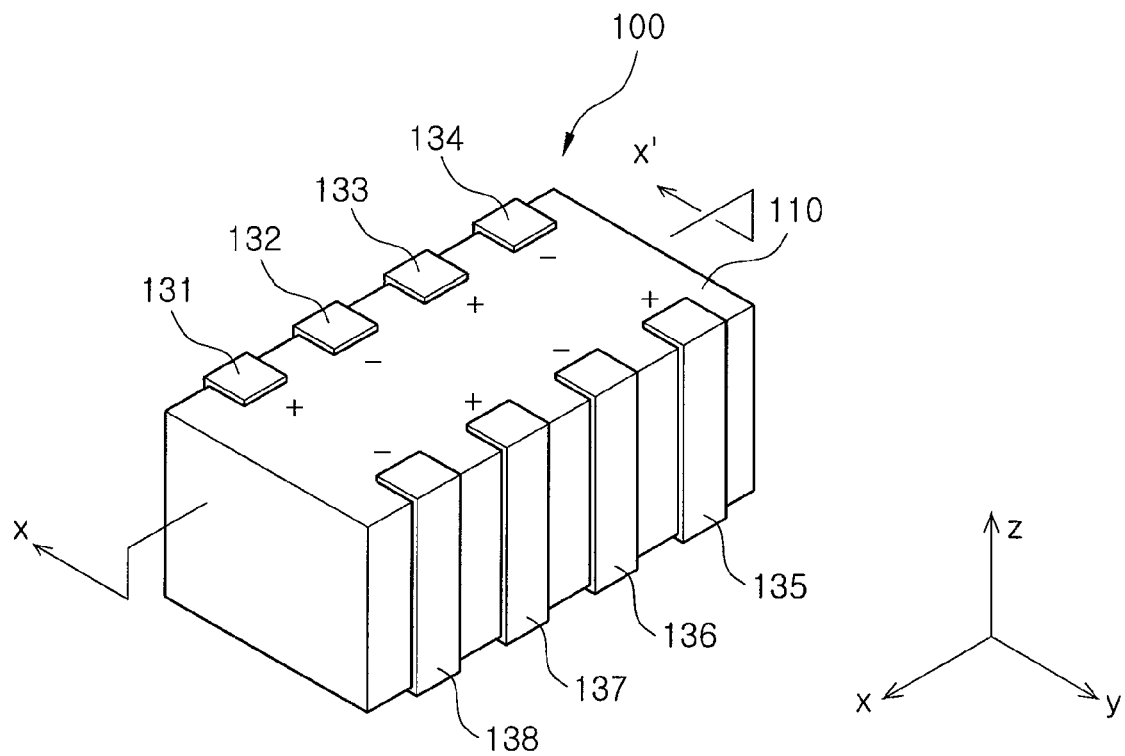
FIG. 3 is a perspective view showing an exterior of a multilayer chip capacitor according to an exemplary embodiment of the present invention.
Figure 4:
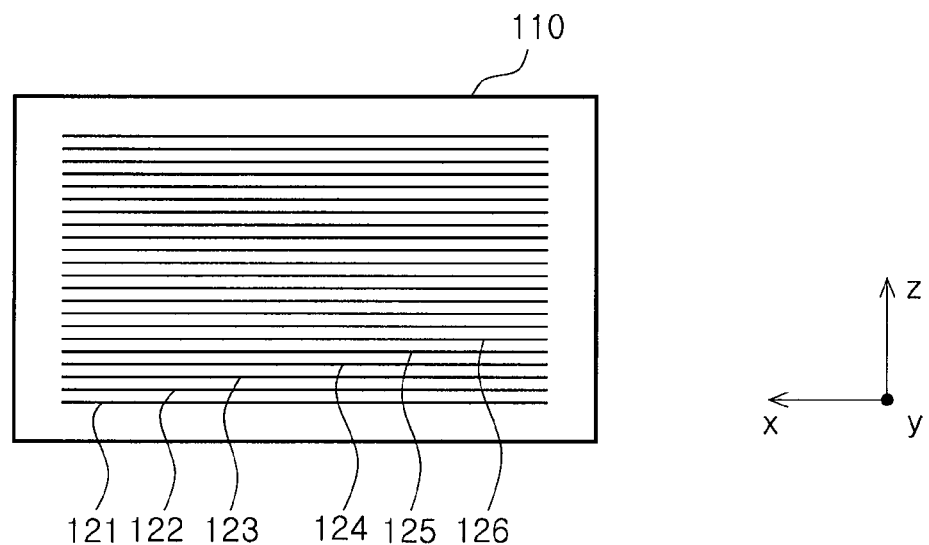
FIG. 4 is a cross-sectional view taken along line X-X' of the multilayer chip capacitor of FIG. 3.

FIG. 3 is a perspective view illustrating an exterior of a multilayer chip capacitor according to an exemplary embodiment of the present invention. FIG. 4 is a cross-sectional view taken along line X-X' of the multilayer chip capacitor of FIG. 3. This multilayer chip capacitor may have various internal electrode structures, and FIG. 5 illustrates one example of the internal electrodes structure.

Referring to FIG. 3, a multilayer chip capacitor 100 includes a capacitor body 110 formed by a stack of a plurality of dielectric layers (see 100a of FIG. 5), and a plurality of external electrodes 131 to 138 (hereinafter, also referred to as first to eighth external electrodes 131 to 138) disposed on both side faces of the capacitor body 110. External electrodes of opposite polarities alternate with each other on each side face of the capacitor body 110. According to this embodiment, the multilayer chip capacitor corresponds to an 8-terminal capacitor having eight external electrodes, but the present invention is not limited thereto. As shown in FIGS. 4 and 5, internal electrodes 121 to 126 (hereinafter, also referred to as first to sixth internal electrodes 121 to 126) are sequentially disposed in the capacitor body 110. The internal electrodes 121 to 126 are disposed with a dielectric layer 110a interposed between each facing set of the internal electrodes 121 and 126, thereby generating electrostatic capacitance. Six internal electrodes 121 to 126 form one block, and such blocks are stacked on top of one another.

Figure 5:
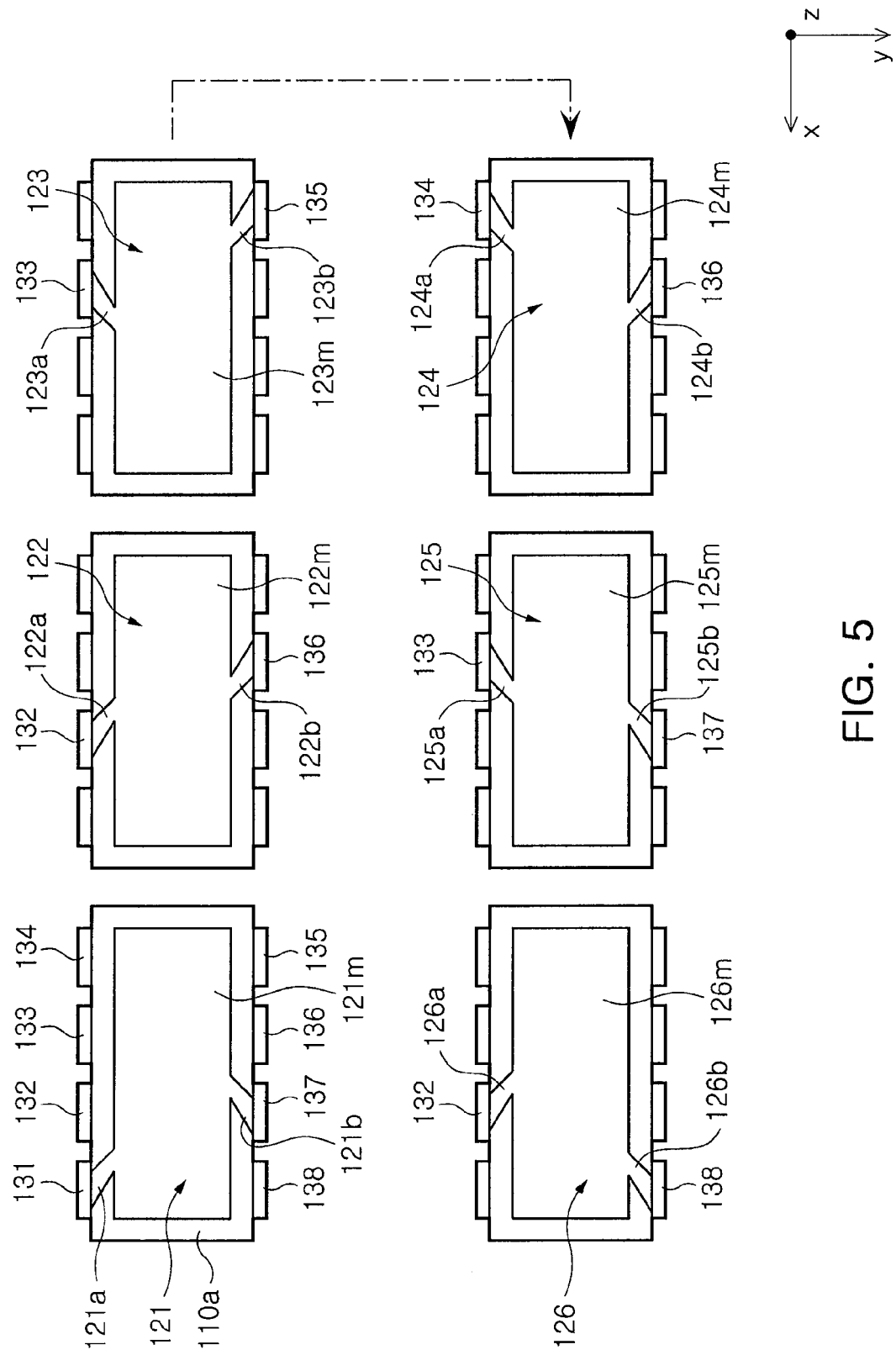
FIG. 5 is a plan view of an example of an internal electrode structure of the multilayer chip capacitor of FIG. 3.

As shown in FIG. 5, the internal electrodes 121 to 126 each include a rectangular main electrode part, and two leads. In detail, the internal electrode 121 includes a main electrode part 121m and two leads 121a and 121b, the internal electrode 122 includes a main electrode part 122m and two leads 122a and 122b, and the internal electrode 123 includes a main electrode 123m and two leads 123a and 123b. Also, the internal electrode 124 includes a main electrode part 124m and two leads 124a and 124b, the internal electrode 125 includes a main electrode part 125m and two leads 125a and 125b, and the internal electrode 126 includes a main electrode part 126m and two leads 126a and 126b.

Each of the leads 121a and 121b to 126a and 126b is connected with a corresponding one of the external electrodes 131 to 138, and extends to the corresponding external electrode to be inclined at a predetermined angle with respect to a corresponding one of the main electrode parts 121m to 126m. Particularly, each of the leads 121a and 121b to 126a and 126b is gradually tapered from a connection portion with the corresponding external electrode toward a connection portion with the corresponding main electrode part. Accordingly, the ESR can be sufficiently increased while the excessive increase of the ESL is suppressed. Alternatively, each of the leads 121a and 121b to 126a and 126b may have a constant width over its entire length (see FIG. 1).

The leads 121a, 124a, 123b and 126b are respectively connected to the external electrodes 131, 134, 135 and 138 disposed at end portions of the side faces of the capacitor body 110. The leads 121a, 124a, 123b and 126b extend from the external electrodes 131, 134, 135 and 138 toward central portions of the main electrode parts 121m, 124m, 123m, 126m, respectively. For example, the lead 121a connected to the first external electrode 131 disposed at one end of a side face extends from the first external electrode 131 toward a central portion of the main electrode part 121m of the first internal electrode 121. Since a lead connected to an external electrode disposed at an end portion of a side face of a capacitor body is inclined toward the center of a main electrode, the lead can have a sufficient length, thereby easily increasing the ESR.

Referring to FIG. 5, each of the internal electrodes 121 to 126 has two leads, and the two leads (e.g., 121a and 121b) extend to both side faces of the capacitor body 110 to be connected to the corresponding external electrodes (e.g., 131 and 137), respectively. In each internal electrode (e.g., 121), a lead (e.g., 121a) extending to one side face and a lead (e.g., 121b) extending to the other side face are offset by one adjacent external electrode position. When viewed from the one side face, the leads of the internal electrodes 121 to 126 are in a zigzag arrangement in a stack direction. For example, the leads 121a, 122a, 123a, 124a, 125a and 126a extending to one side face of the internal electrodes 121 to 126 are respectively connected to the external electrodes in the order of 131, 132, 133, 134, 133, 132, 131, 132, 133, 134, . . . , along the stack direction. The leads 121b, 122b, 123b, 124b, 125b and 126b extending to the other side face of the internal electrodes 121 to 126 are also in a zigzag arrangement along the stack direction.

The first to eighth external electrodes 131 to 138 are sequentially disposed along a circumference of the capacitor body 110 as shown in FIG. 3. In this case, the first to sixth internal electrodes 121 to 126 are connected to the first to eighth external electrodes 131 to 138 in the following relation.

Referring to FIG. 5, the respective leads 121a, 122a, 123a and 124a of the first to fourth internal electrodes 121 to 124 extending to one side face are respectively connected to the first to fourth external electrodes 131, 132, 133 and 134. The respective leads 125a and 126a of the fifth and sixth internal electrodes 125 and 126 extending to the one side face are respectively connected to the third and second external electrodes 133 and 132. Thus, the respective leads 121a to 126a of the internal electrodes 121 to 126 extending to the one side face are arranged in zigzags along the stack direction within a range from the first external electrode 131 to the fourth external electrode 134. When viewed from the other side, the respective leads 121b, 122b, 123b, 124b, 125b and 126b of the internal electrodes 121 to 126 extending to the other side face are arranged in zigzags within a range from the fifth external 135 and the eighth external electrodes 138. The zigzag arrangements of the leads advantageously reduce mutual inductance between the leads (e.g., 122a and 126b) of the same polarity which are connected to the same external electrode and are adjacent to each other in the stack direction. Also, a lead (e.g., 121b) extending to the other side face and a lead (e.g., 121a) extending to the one side face from the same internal electrode (e.g., 121) are offset by one adjacent external electrode position. Because the leads are in the zigzag and offset arrangements, internal electrodes of the same polarity are connected to one another within the multilayer chip capacitor.

Figure 6:
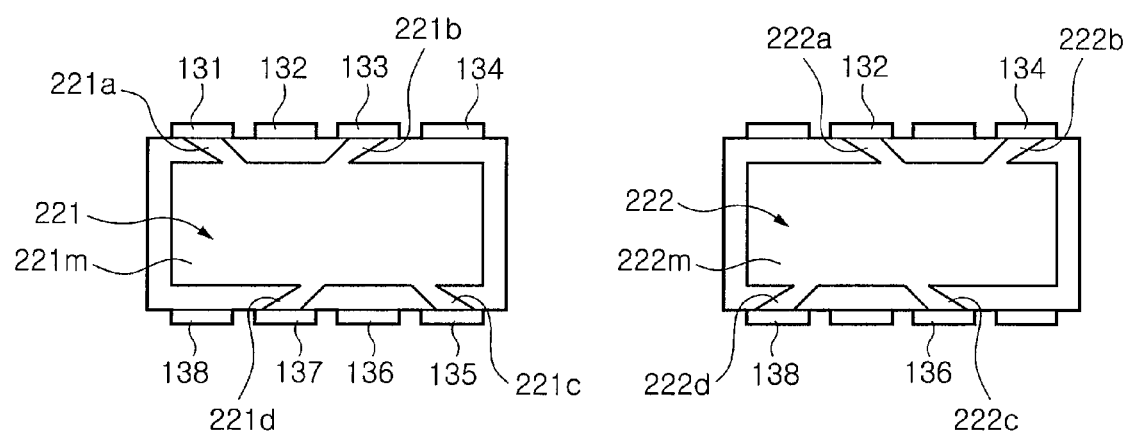
FIG. 6 is a plan view of another example of an internal electrode structure of the multilayer chip capacitor of FIG. 3.

FIG. 6 illustrates another example of the internal electrode structure of the multilayer chip capacitor. Compared to the multilayer chip capacitor of FIG. 3, the multilayer chip capacitor of FIG. 6 has the same exterior (i.e., an 8-terminal capacitor), and the same reference numerals are used for external electrodes. In the capacitor body 110, a first internal electrode 221 of one polarity (e.g., a positive polarity) faces a second internal electrode 222 of the other polarity (e.g., a negative polarity) with a dielectric layer interposed between therebetween. Also, internal electrodes of opposite polarities alternate with each other in the order of 221, 222, 221, 222, . . . along the stack direction.

Each of the internal electrodes 221 and 222 has four leads. That is, the internal electrode 221 has four leads 221a, 221b, 221c and 221d, and the internal electrode 222 has four leads 222a, 222b, 222c and 222c. The leads 221a to 221d of the first internal electrode 221 are respectively interdigitated with the leads 222a to 222d of the second internal electrode 222 to be adjacent to one another. The leads 221a to 221d of the first internal electrode 221 are respectively connected to the external electrodes 131, 133, 135 and 137 of the first polarity (e.g., a positive polarity), and the leads 222a to 222d of the second internal electrode 222 are respectively connected to the external electrodes 132, 134, 136 and 138 of the second polarity (a negative polarity).

In the example of FIG. 6, each of the leads 221a to 221d and 222a to 222d extend to a corresponding one of the external electrodes 131 to 138 to be inclined at a predetermined angle with respect to a corresponding one of the main electrodes 221m and 222m. Particularly, the leads 221a to 221d and 222a to 222d are tapered from their connection portions with the external electrodes 131 to 138 toward their connection portions with the main electrode parts 221m and 222m, respectively. Alternatively, each of the leads 221a to 221d and 222a to 222d may have a constant width without being tapered (see FIG. 1). In the example of FIG. 6, a lead (e.g., 222b) connected to an external electrode (e.g., 134) disposed at an end portion of a side face of a capacitor body extends from a corresponding external electrode (e.g., 134) toward a central portion of a main electrode part of the external electrode.

Figure 7:
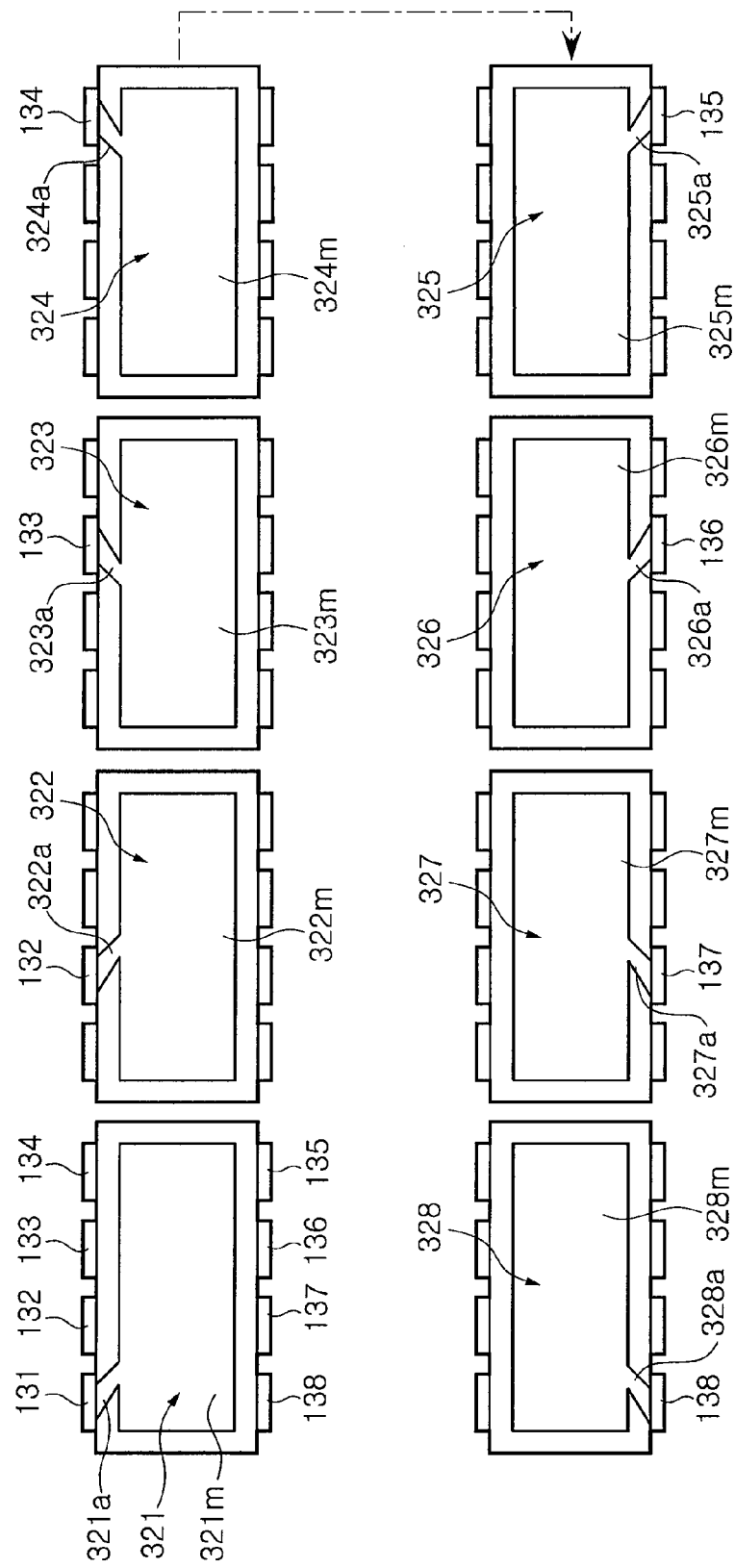
FIG. 7 is a plan view of still another example of an internal electrode structure of the multilayer chip capacitor of FIG. 3.

FIG. 7 illustrates still another example of the internal electrode structures of the multilayer chip capacitor. Compared to the multilayer chip capacitor of FIG. 3, the multilayer chip capacitor of FIG. 7 has the same exterior (i.e., an 8-terminal capacitor), and the same reference numerals are used for external electrodes.

Referring to FIG. 7, four internal electrodes 321, 323, 325 and 327 of one polarity (e.g., a positive polarity) respectively alternate with four internal electrodes 322, 324, 326 and 328 of the other polarity (e.g., a negative polarity) to face each other. Eight internal electrodes 321 to 328 (hereinafter, also referred to as first to eighth internal electrodes 321 to 328) form one block, and such blocks are stacked on top of one another. The internal electrodes 321 to 328 each have only one lead. That is, the internal electrodes 321 to 328 have leads 321a to 328a, respectively.

Referring to FIG. 7, the leads 321a to 328a of the first to eighth internal electrodes 321 to 328 are respectively and sequentially connected to the first to eighth external electrodes 131 to 138 along a circumference of a capacitor body. Thus, in the internal electrodes of opposite polarities, which are adjacent to each other in the stack direction and have leads extending to the same side face, the leads (e.g., 321a and 322a; 322a and 323a; 323a and 324a) are disposed adjacent to each other so as to be connected to the external electrodes (e.g., 131 and 132; 132 and 133; 133 and 134) which are adjacent to each other on the same side face. Accordingly, the magnetic flux caused by the current flowing through the leads (e.g., 321a and 322a; 322a and 323a; 323a and 324a) of opposite polarities, which are adjacent to each other, are canceled, thereby decreasing the ESL.

Also in the example of FIG. 7, the leads 321a to 328a extend to the external electrodes 131 to 138 to be inclined at predetermined angles with respect to the main electrode parts 321m to 328m, respectively. Particularly, the leads 321a to 328a are tapered from their respective connection portions with the external electrodes 131 to 138 toward their respective connection portions with the main electrode parts 321m and 328m. Alternatively, each of the leads 321a to 328a may have a constant width without being tapered (see FIG. 1). In the example of FIG. 7, a lead (e.g., 324a) connected to an external electrode (e.g., 134) disposed at an end portion of a side face of a capacitor body extends from the external electrode (e.g., 134) toward a central portion of a main electrode part (e.g., 324m).

The present invention is not limited to an 8-terminal capacitor, and may be applied to 10, 12 or more terminal capacitors. The present invention may be applied to a 2-terminal low inductance chip capacitor (LICC).

Figure 8:
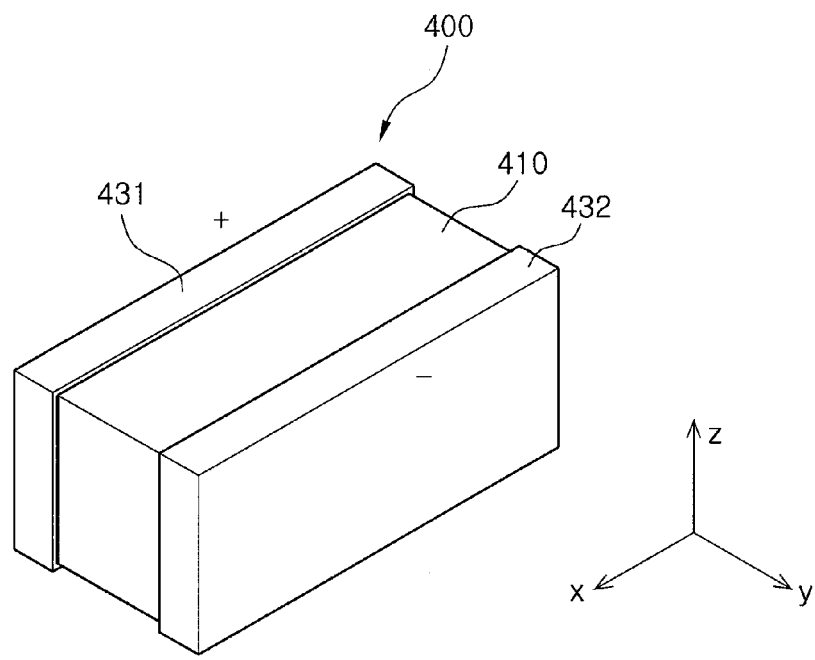
FIG. 8 is a perspective view of an exterior of a multilayer chip capacitor according to another exemplary embodiment of the present invention.
Figure 9:
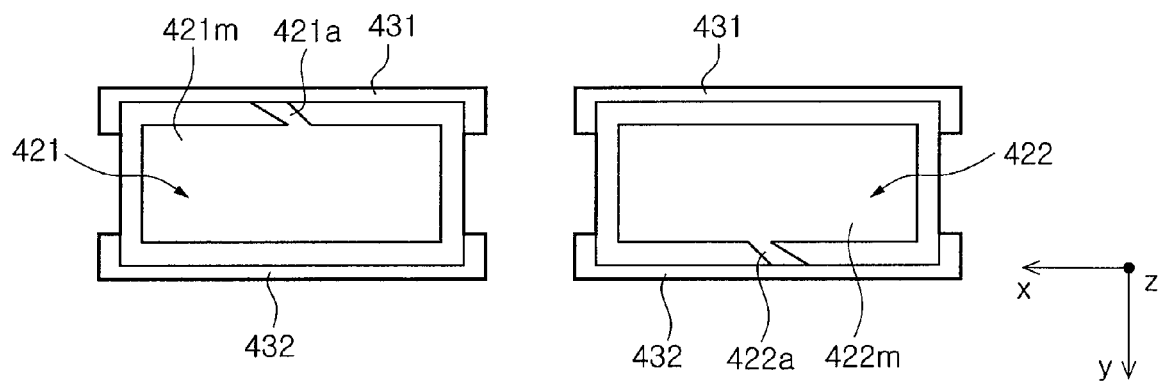
FIG. 9 is a plan view of an example of an internal electrode structure of the multilayer chip capacitor of FIG. 8.

FIG. 8 is a perspective view of an exterior of a multilayer chip capacitor according to another exemplary embodiment of the present invention. FIG. 9 is a plan view of an internal electrode structure of the multilayer chip capacitor of FIG. 8.

Referring to FIG. 8, a multilayer chip capacitor 400 includes a capacitor body 410, and first and second external electrodes 431 and 432. The capacitor body 410 has top and bottom faces, first and second longer side faces facing each other, and first and second shorter side faces facing each other. The first and second external electrodes 431 and 432 have different polarities. For example, the first external electrode 431 has a positive polarity, and the second external electrode 432 has a negative polarity. The first and second external electrodes 431 and 432 are respectively disposed on the facing first and second longer side faces of the capacitor body 410.

Referring to FIG. 9, in the capacitor body 410, first and second internal electrodes 421 and 422 are alternately disposed in the capacitor body 410 to face each other with a dielectric layer interposed between each facing set of the first and second internal electrodes 421 and 422. The first internal electrode 421 is connected to the first external electrode 431 through a lead 421a, and the second internal electrode 422 is connected to the second external electrode 432 through a lead 422a. The lead 421a of the first internal electrode 421 extends to the first external electrode 431 to be inclined at a predetermined angle with respect to a main electrode part 421m. The lead 422a of the second internal electrode 422 extends to the second external electrode 432 to be inclined at a predetermined angle with respect to a main electrode part 422m. According to this embodiment, the lead 421a is tapered from its connection portion with the external electrode 431 toward its connection portion with the main electrode part 421m. The lead 422a is tapered from its connection portion the external electrode 432 toward its connection portion with the main electrode part 422m. Alternatively, the leads 421 and 422a each may have a constant width (see FIG. 1).

Figure 10:
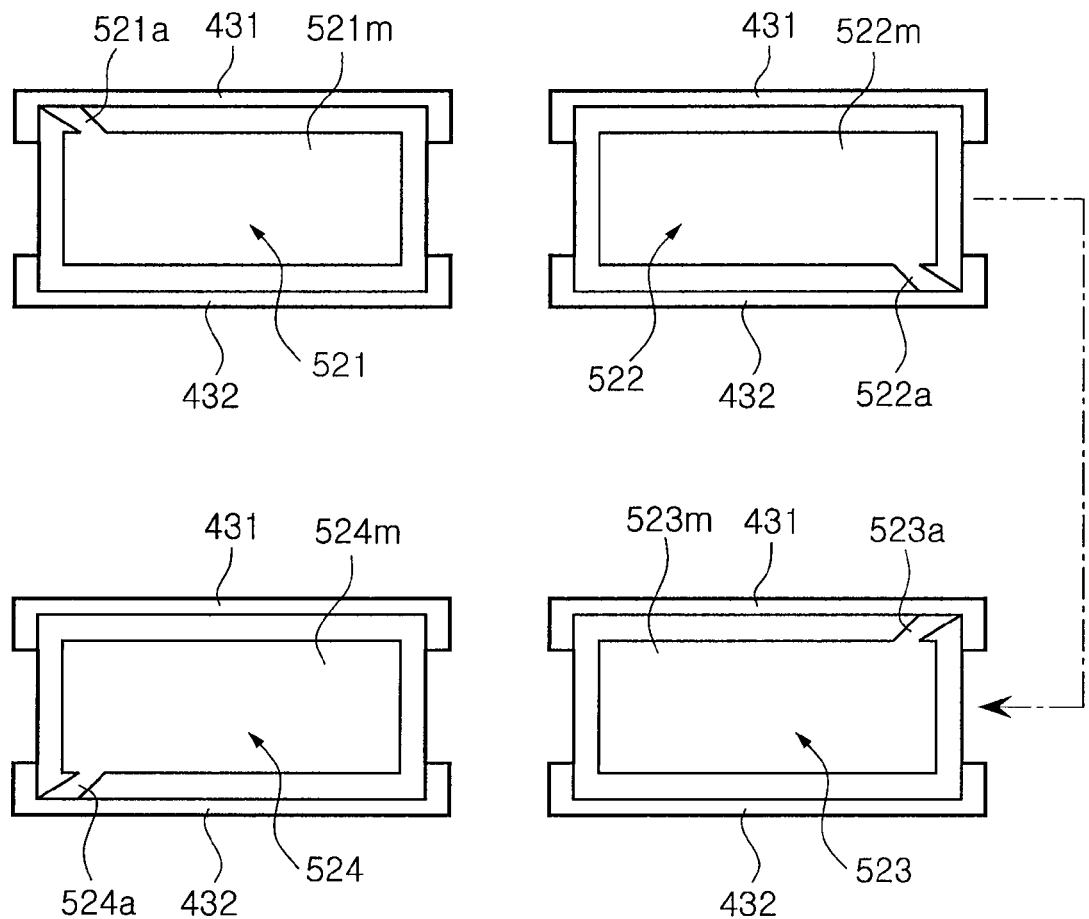
FIG. 10 is a plan view of another example of an internal electrode structure of the multilayer chip capacitor of FIG. 8.

FIG. 10 is a plan view illustrating another example of the internal electrode structure of the multilayer chip capacitor of FIG. 8. Referring to FIG. 10, first to fourth internal electrodes 521, 522, 523 and 524 in the capacitor body 410 are sequentially disposed to face each other with a dielectric layer interposed between each facing set of the first to fourth internal electrodes 521 to 524. The first to fourth internal electrodes 521 to 524 form one block, and such blocks are stacked on top of one another. The first to fourth internal electrodes 521 to 524 each may include a rectangular main electrode part and one lead. Reference numerals 521m to 524m of FIG. 10 represent the rectangular main electrode parts of the first to fourth internal electrodes 521 to 524, respectively. Reference numerals 521a to 524a of FIG. 10 represent the leads of the first to fourth internal electrodes 521 to 524, respectively.

The lead 521a of the first internal electrode 521 extends to a portion of the first longer side face adjacent to a first corner where the first longer side face and the first shorter side face meet each other. The lead 521a of the first internal electrode 521 is connected to the first external electrode 421 of one polarity (e.g., a positive polarity). The lead 522a of the second internal electrode 522 extends to a portion of the second longer side face adjacent to a second corner diagonally facing the first corner. The lead 522a of the second internal electrode 522 is connected to the second external electrode 432 of the other polarity (e.g., a negative polarity). Also, the lead 523a of the third internal electrode 523 extends to a portion of the first longer side face adjacent to a third corner where the first longer side face and the second shorter side face meet each other. The lead 523a of the third internal electrode 523 is connected to the first external electrode 431. The lead 524a of the fourth internal electrode 524 extends to a portion of the second longer side face adjacent to a fourth corner diagonally facing the third corner. The lead 524a of the fourth internal electrode 524 is connected to the second external electrode 432.

Because of the above disposition of the internal electrodes 521 to 524 and the leads 521a to 5214a, a diagonal current flow is formed from the first lead 521a of the positive polarity toward the second lead 522a of the negative polarity during a capacitor operation. Also, a diagonal current flow is formed from the third lead 523a of the positive polarity toward the fourth lead 524a of the negative polarity. Thus, current paths in the internal electrodes, particularly in the main electrode parts are elongated in a diagonal direction, thereby contributing to an increase of the ESR. As in the previous embodiment, the leads 521a to 524a extending to a corresponding one of the external electrodes 431 and 432 are inclined at predetermined angles with respect to the respective main electrode parts 521m to 524m. Since the current paths are increased even in each lead, the ESR can be further increased. The current flow formed from the first corner to the second corner by the facing set of the first and second internal electrodes 521 and 522 is in an opposite direction to the current flow formed from the third corner to the fourth corner by the facing set of the third and fourth internal electrodes 523 and 524, with respect to a component of a longer side direction (i.e., an x-axial direction: see FIG. 8) of the main electrode part. For this reason, the magnetic flux caused by the current in the internal electrodes is considerably canceled, thereby suppressing the ESL.

Embodiment

An 8-terminal multilayer chip capacitor (having an inclined lead structure) having a structure illustrated in FIGS. 3 through 5 was manufactured, and the ESR and ESL thereof were measured. Each lead has a lead width of about 100 μm at a connection portion with a corresponding external electrode, and a lead width of about 50 μm at a connection portion with a corresponding main electrode part. As shown in FIG. 5, internal electrodes each having leads and a main electrode part were easily realized by using screen-printing. A capacitor of a comparison example is different from the embodiment of the present invention in that each of leads extends perpendicularly from a longer side of a corresponding one of rectangular main electrode parts (without being inclined). Accordingly, the capacitor of the comparison example is also an 8-terminal capacitor, and each internal electrode has two leads.

As a result of measuring ESR and ESL of the respective capacitors of the embodiment and the comparison example, the ESR of the comparison example is about 21.5 mΩ, whereas the ESR of the embodiment is 49.6 mΩ, which is two times greater than the ESR of the comparison example. The ESL of the embodiment was 69 pH, which is just slightly higher than 61 pH of the ESL of the comparison example. Consequently, it can be seen that by using the inclined lead structure, the ESR can be easily increased, and the increase of the ESL can be sufficiently suppressed.

According to the present invention, the ESR can be effectively increased while an increase of the ES is suppressed.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
  a capacitor body provided by a stack of a plurality of dielectric layers;
  a plurality of internal electrodes disposed in the capacitor body such that the internal electrodes of opposite polarities are alternately disposed to face each other with the dielectric layer interposed between each facing set of the internal electrodes; and
  a plurality of external electrodes disposed on an outer face of the capacitor body and electrically connected with the internal electrode,
  wherein each of the plurality of internal electrodes comprises:
  a main electrode part;
  at least one lead extending from the main electrode part to a side face of the capacitor body and connected to a corresponding one of the external electrodes, the lead extending to the corresponding external electrode to be inclined with respect to the main electrode part thereof,
  the lead has a gradually greater width at its connection portion with the corresponding external electrode and a gradually smaller width at its connection portion with the main electrode part, and
  all leads connected to the external electrode disposed at an end portion of the side face of the capacitor body extend toward a central portion of the main electrode part from the external electrode disposed at the end portion of the side face of the capacitor body.

2. The multilayer chip capacitor of claim 1, wherein the lead is gradually tapered from the connection portion with the corresponding external electrode to the connection portion with the main electrode part thereof.

3. The multilayer chip capacitor of claim 1, wherein capacitor has first and second side faces facing each other,
  the plurality of external electrodes are disposed on the first and second side faces such that the external electrodes of opposite polarities are alternately disposed on each of the first and second side faces, and
  each of the internal electrodes has two leads extending to the first and second side faces to be connected to the external electrodes, respectively, wherein,
  the lead extending to the first side face and the lead extending to the second side face in each of the internal electrodes are offset by one adjacent external electrode position, and the leads of the plurality of internal electrodes are disposed in zigzags along a stack direction when viewed from each of the first and second side faces.

4. The multilayer chip capacitor of claim 3, wherein four external electrodes are disposed on each of the first and second side faces.

5. The multilayer chip capacitor of claim 4, wherein first to fourth external electrodes are disposed on the first side face, fifth and eighth external electrodes are disposed on the second side face, and the first to eighth external electrodes are sequentially disposed along a circumference of the capacitor body,
the plurality of internal electrodes comprise first to sixth internal electrodes sequentially consecutively stacked on top of each other, wherein each of the first to sixth internal electrodes has two leads respectively extending to the first and second side faces, the two leads each being connected to a corresponding one of the external electrodes, and
the leads of the first to fourth internal electrodes extending to the first side face are respectively connected to the first to fourth external electrodes, the lead of the fifth internal electrode extending to the first side face is connected to the third external electrode, and the lead of the sixth internal electrode extending to the first side face is connected to the second external electrode, wherein,
the leads extending to the second side face are arranged in zigzags between the fifth external electrode and the eighth external electrode when viewed from the second side face, and
the lead extending to the first side face and the lead extending to the second side face in each of the internal electrodes are offset by one adjacent external electrode position.

6. The multilayer chip capacitor of claim 1, wherein the plurality of internal electrodes comprise first to second internal electrodes of opposite polarities alternately disposed along a stack direction, the first and second internal electrodes each having at least two leads, and
the leads of the first internal electrodes are interdigitated with the leads of the second internal electrodes to be adjacent to one another, and are connected with the external electrodes of a corresponding polarity.

7. The multilayer chip capacitor of claim 1, wherein each of the plurality of internal electrodes has one lead connected to a corresponding one of the external electrodes,
wherein in the internal electrodes of opposite polarities having leads extending to the same side face of the capacitor body and disposed adjacent to each other in a stack direction, the leads are respectively connected to adjacent external electrodes on the same side face.

8. The multilayer chip capacitor of claim 1, wherein the capacitor body has first and second longer side faces facing each other, and first and second shorter side faces facing each other,
the plurality of external electrodes comprise first and second external electrodes having opposite polarities and disposed on the first and second longer side faces, respectively,
the plurality of internal electrodes comprise a first internal electrode and a second internal electrode facing each other with the dielectric layer interposed between each facing set of the first and second internal electrodes, and
the first and second internal electrodes comprise main electrode parts and leads respectively extending from the main electrode parts to be connected to the first and second external electrodes, wherein the leads of the first and second external electrodes extend to the first and second external electrodes to be inclined with respect to the main electrode parts, respectively.

9. The multilayer chip capacitor of claim 8, wherein the plurality of internal electrodes further comprise third and fourth internal electrodes facing each other with the dielectric layer interposed between each facing set of the third and fourth internal electrodes, and the first to fourth internal electrodes each have one lead and are sequentially disposed along a stack direction,
wherein the first internal electrode has a first lead extending to a portion of the first longer side face adjacent to a first corner at which the first longer side face meets the first shorter side face, the first lead being connected to the first external electrode,
the second internal electrode has a second lead extending to a portion of the second longer side face adjacent to a second corner diagonally facing the first corner, the second lead being connected to the second external electrode,
the third internal electrode has a third lead extending to a portion of the first longer side face adjacent to a third corner at which the first longer side face meets the second shorter side face, the third lead being connected to the first external electrode, and
the fourth internal electrode has a fourth lead extending to a portion of the second longer side face adjacent to a fourth corner diagonally facing the third corner, the fourth lead being connected to the second external electrode.

10. The multilayer chip capacitor of claim 9, wherein the facing set of the first and second internal electrodes form a current flow from the first corner toward the second corner, and the facing set of the third and fourth internal electrodes form a current flow from the third corner toward the fourth corner.

* * * * *